United States Patent
Higgins (10) Patent No.: US 9,159,460 B2
(45) Date of Patent: Oct. 13, 2015

(54) BUNDLE RETENTION CLIP, FUEL ASSEMBLY INCLUDING THE SAME, AND METHOD OF ASSEMBLING FUEL ASSEMBLY

(75) Inventor: Russell P. Higgins, Wilmington, NC (US)

(73) Assignee: GLOBAL NUCLEAR FUELS—AMERICAS, LLC, Wilmington, NC (US)

( * ) Notice: Subject to any disclaimer, the term of this patent is extended or adjusted under 35 U.S.C. 154(b) by 745 days.

(21) Appl. No.: 13/241,809

(22) Filed: Sep. 23, 2011

(65) Prior Publication Data

US 2013/0077732 A1    Mar. 28, 2013

(51) Int. Cl.
*G21C 19/28* (2006.01)
*G21C 3/30* (2006.01)
*G21C 3/33* (2006.01)
*G21C 3/332* (2006.01)
*G21C 3/334* (2006.01)

(52) U.S. Cl.
CPC *G21C 3/30* (2013.01); *G21C 3/331* (2013.01); *G21C 3/332* (2013.01); *G21C 3/334* (2013.01); *G21C 3/3305* (2013.01); *Y02E 30/40* (2013.01); *Y10T 24/44932* (2015.01); *Y10T 29/49826* (2015.01)

(58) Field of Classification Search
CPC .................. G21C 3/33; G21C 3/331
See application file for complete search history.

(56) References Cited

U.S. PATENT DOCUMENTS

| | | | | |
|---|---|---|---|---|
| 3,856,623 A | * | 12/1974 | Kamo | 376/440 |
| 4,560,532 A | * | 12/1985 | Barry et al. | 376/434 |
| 4,684,499 A | * | 8/1987 | Gjertsen et al. | 376/446 |
| 5,436,946 A | | 7/1995 | Curulla et al. | |
| 5,546,642 A | * | 8/1996 | Anscher | 24/625 |
| 5,627,866 A | | 5/1997 | Dunlap et al. | |
| 5,794,316 A | * | 8/1998 | Anscher | 24/625 |
| 6,356,614 B1 | * | 3/2002 | Allen et al. | 376/437 |
| 2013/0163712 A1 | * | 6/2013 | Kurzer et al. | 376/437 |

OTHER PUBLICATIONS

European Search Report for corresponding EP Application No. 12184358.5 dated Jan. 15, 2015.

* cited by examiner

*Primary Examiner* — Jack W Keith
*Assistant Examiner* — Sharon M Davis
(74) *Attorney, Agent, or Firm* — Harness, Dickey & Pierce, P.L.C.

(57) ABSTRACT

A fuel assembly may include a channel nosepiece; a lower tie plate positioned above the channel nosepiece; and at least one bundle retention clip connected to the channel nosepiece and the lower tie plate and configured to resist movement of the lower tie plate away from the channel nosepiece.

7 Claims, 10 Drawing Sheets

S705 — Insert bundle retention clip into opening in modified channel nosepiece

S710 — Place modified lower tie plate on bundle retention clip so engagement region of clip enters slot of modified lower tie plate

BUNDLE RETENTION CLIP, FUEL ASSEMBLY INCLUDING THE SAME, AND METHOD OF ASSEMBLING FUEL ASSEMBLY

BACKGROUND

1. Field

The disclosure relates to devices for maintaining a desired position of a fuel bundle within a fuel assembly.

2. Description of Related Art

Figure 1:
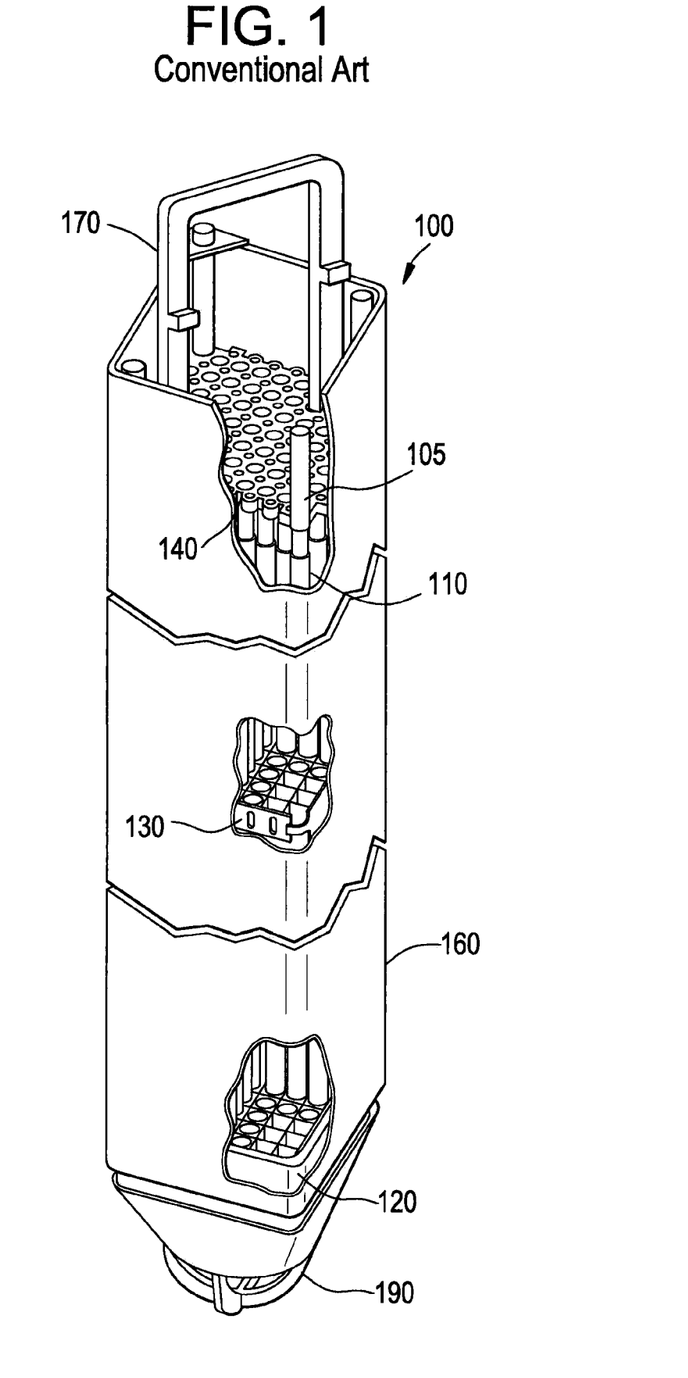
FIG. 1 illustrates an example of a conventional fuel assembly of a boiling water reactor (BWR).

FIG. 1 illustrates an example of a conventional fuel assembly 100 of a boiling water reactor (BWR), including a fuel bundle 105 and a fuel channel 160. As shown in FIG. 1, the fuel bundle 105 encloses a plurality of fuel rods 110. The fuel rods 110 within the fuel bundle 105 are supported at a lower end by a lower tie plate 120, along a length thereof by one or more spacers 130, and at the top by an upper tie plate 140. The fuel bundle 105 includes a bail handle for transporting the fuel bundle 105. The fuel assembly 100 also includes a fuel channel 160, which encloses the fuel bundle 105, and a nosepiece 190 which allows water to flow into and through the fuel bundle 105. In addition to fuel rods 110, the conventional fuel bundle 105 typically includes water rods near the center of the fuel bundle 105 that allow the coolant to flow therethrough for neutron moderation.

During the operation of a boiling water reactor, water is supplied to a fuel bundle through the entrance on the nosepiece 190. Ideally, the water exits the fuel bundle as pure steam which is used to drive a turbine.

SUMMARY

One or more embodiments relate to a bundle retention clip for maintaining a desired position of a fuel bundle within a fuel assembly; a fuel assembly including the bundle retention clip and a method of installing the bundle retention clip a fuel assembly.

According to at least one example embodiment, a fuel assembly may include a channel nosepiece; a lower tie plate positioned above the channel nosepiece; and at least one bundle retention clip connected to the channel nosepiece and the lower tie plate and configured to resist movement of the lower tie plate away from the channel nosepiece.

The lower tie plate may include at least one slot, and the at least one bundle retention clip may include an engagement region configured to be inserted into the slot.

The at least one slot and the engagement region may be configured such that once the engagement region is inserted into the slot, the retention clip responds to vertical separation of the lower tie plate and the bundle retention clip by causing a force to be exerted on the lower tie plate in a direction towards the channel nosepiece.

The engagement region may include at least one spring member. The at least one spring member may include a first protrusion extending outward from a central axis of the retention clip. The first protrusion may include a first edge angled with respect to the central axis at a first angle such that application of a force to the first angled edge, the force being parallel to the central axis, causes the spring member to contract, the central axis being defined as an axis extending down a center of the retention clip along a length of the retention clip.

The at least one bundle retention clip may further include a base region connected to the engagement region, at least a portion of the base region being wider than a remainder of the retention clip in a direction perpendicular to the central axis.

The first angle may be between 45° and 52°.

The at least one spring member may include a second protrusion extending outward from the central axis and spaced apart from the first protrusion.

The at least one spring member may be arranged as a cantilever spring capable of rotating inwards towards the central axis and configured to respond to the inward rotation by exerting an outward, lateral force.

The at least one spring member may include first and second spring members formed at opposite sides of the central axis.

The engagement region may further includes a middle member formed in between the first and second spring members such that a first gap exists between the middle member and the first spring member, and a second gap exists between the middle member and the second spring member.

According to at least one example embodiment, a retention clip may include an engagement region. The engagement region may include at least one spring member. The at least one spring member may include a first protrusion extending outward from a central axis of the retention clip. The first protrusion may include a first edge angled with respect to the central axis at a first angle such that application of a force to the first angled edge, the force being parallel to the central axis, causes the spring member to contract, the central axis being defined as an axis extending down a center of the retention clip along a length of the retention clip.

The retention clip may further include a base region connected to the engagement region, at least a portion of the base region being wider than a remainder of the retention clip in a direction perpendicular to the central axis.

The first angle may be between 45° and 52°.

The at least one spring member may include a second protrusion extending outward from the central axis and spaced apart from the first protrusion.

The at least one spring member may be arranged as a cantilever spring capable of rotating inwards towards the central axis and configured to respond to the inward rotation by exerting an outward, lateral force.

The at least one spring member may include first and second spring members formed at opposite sides of the central axis.

The engagement region may further include a middle member formed in between the first and second spring members such that a first gap exists between the middle member and the first spring member, and a second gap exists between the middle member and the second spring member.

According to at least one example embodiment, a method of assembling a fuel assembly, the fuel assembly including a channel nosepiece; a lower tie plate positioned above the channel nosepiece; and at least one bundle retention clip connected to the channel nosepiece and the lower tie plate and configured to resist movement of the lower tie plate away from the channel nosepiece, the channel nosepiece including an opening, the lower tie plate including a slot, the at least one bundle retention clip including a base region configured to fit into the opening and an engagement region configured to be inserted into the slot, may include inserting the base region of bundle retention clip into the opening of the channel nosepiece; and placing the lower tie plate onto the bundle retention clip such that the engagement region of the bundle retention clip enters the slot of the lower tie plate.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

In boiling water reactor (BWR) plants having higher power levels and higher flow rates, it is possible that under certain transient conditions the vertical hydraulic forces on a fuel bundle could overcome the bundle weight and cause the lower tie plate 120 of the conventional fuel bundle 105 to lift from its normal seated position on the channel nosepiece 190. A modified fuel assembly configured to counteract this lift condition will now be discussed.

Modified Fuel Assembly

FIGS. 2A-2E illustrate a portion of a modified fuel assembly 100' according to an example embodiment from various side angles. The modified fuel assembly 100' includes a modified lower tie plate 120', a modified channel nosepiece 190', and first through fourth bundle retention clips 200A-D.

First through fourth bundle retention clips 200A-D may be composed of, for example, alloy X750.

Figure 2A:
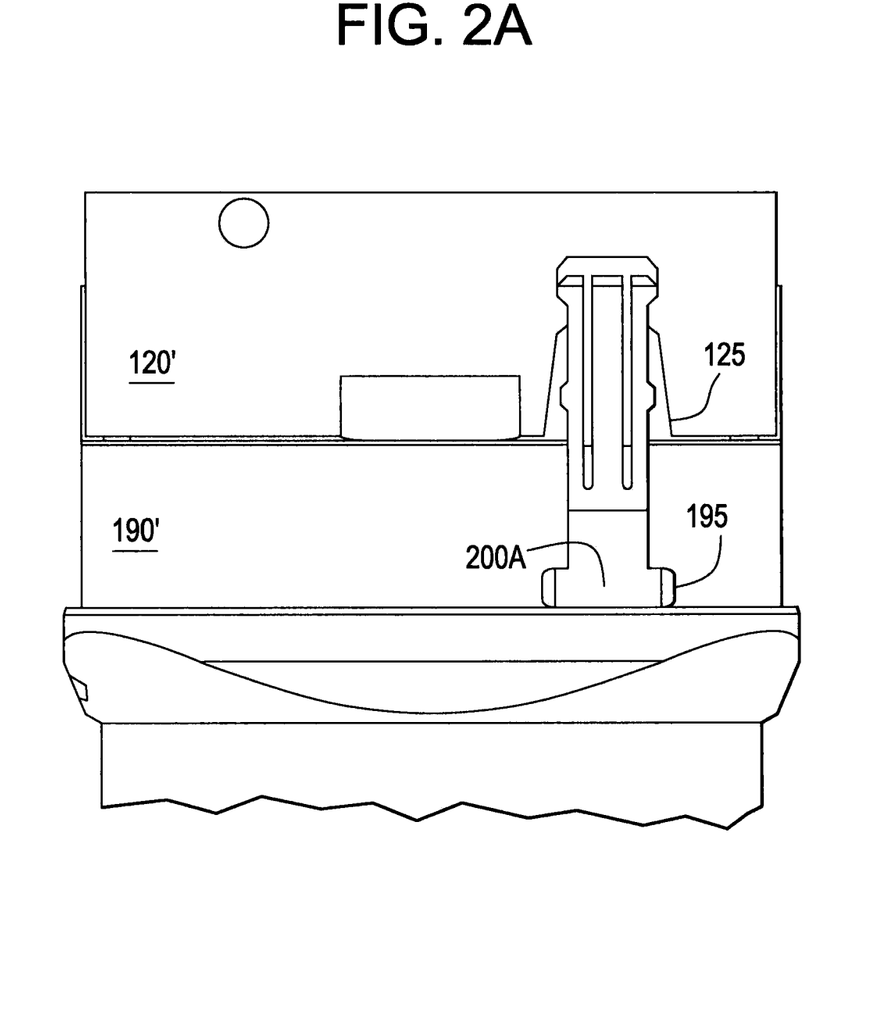
FIGS. 2A-2E are various views of a portion of a modified fuel assembly according to at least one example embodiment.
Figure 2B:
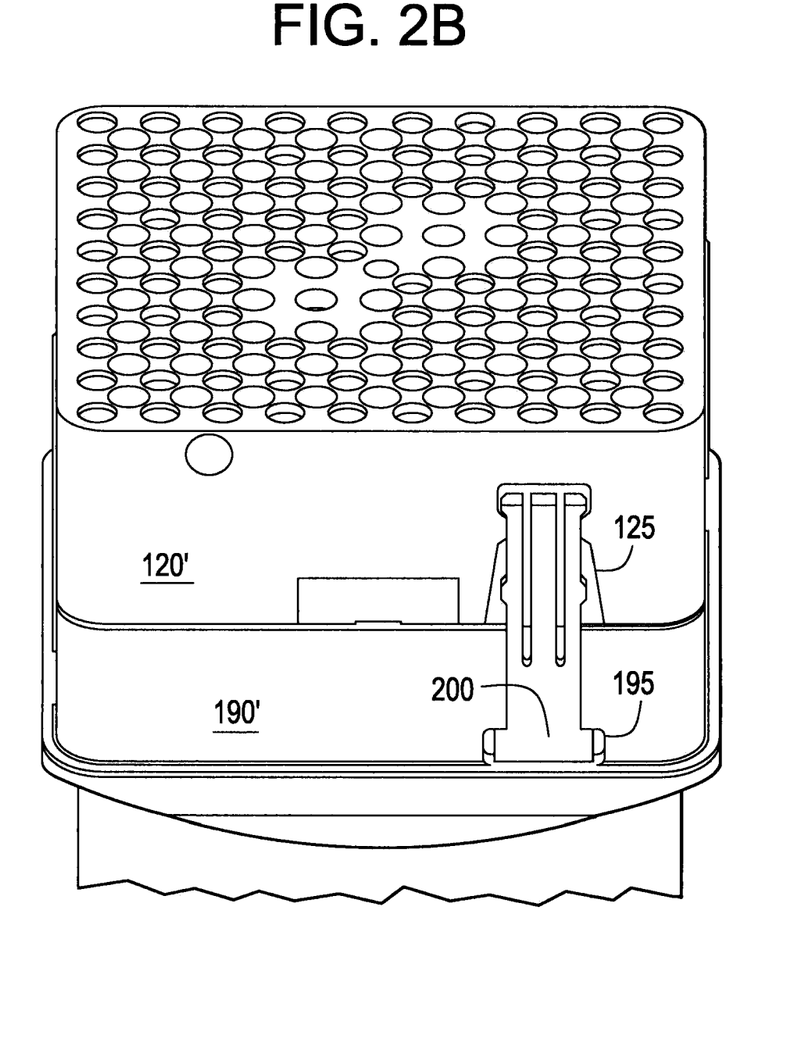
Figure 2C:
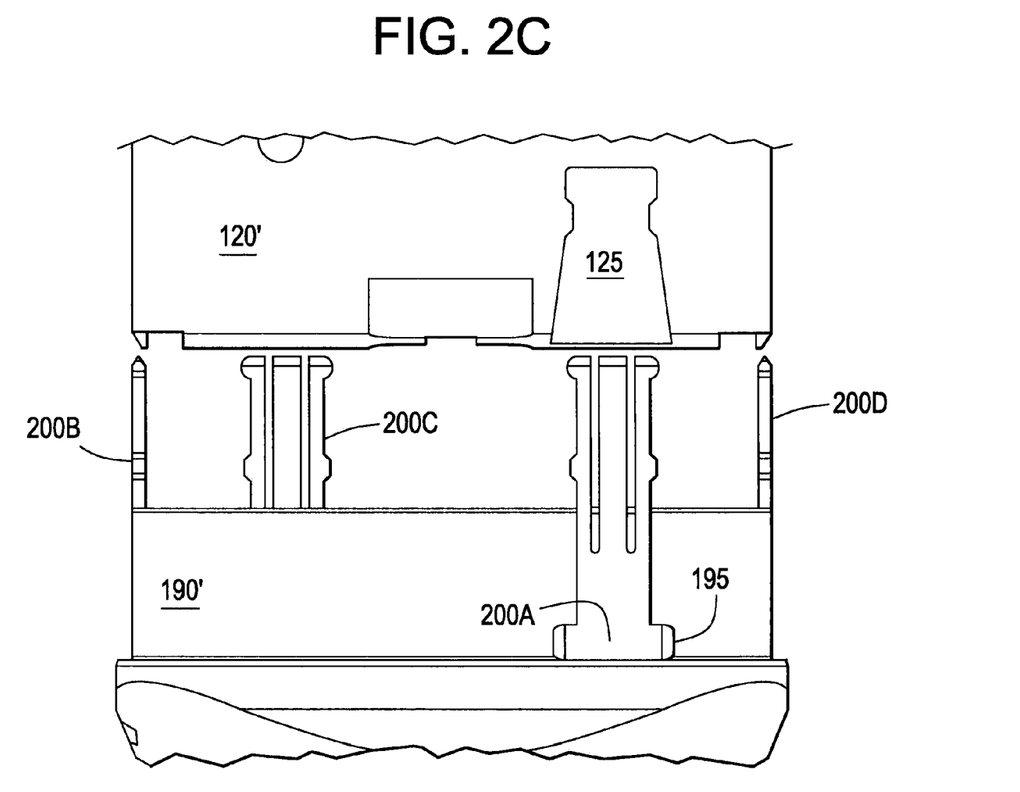
Figure 2D:
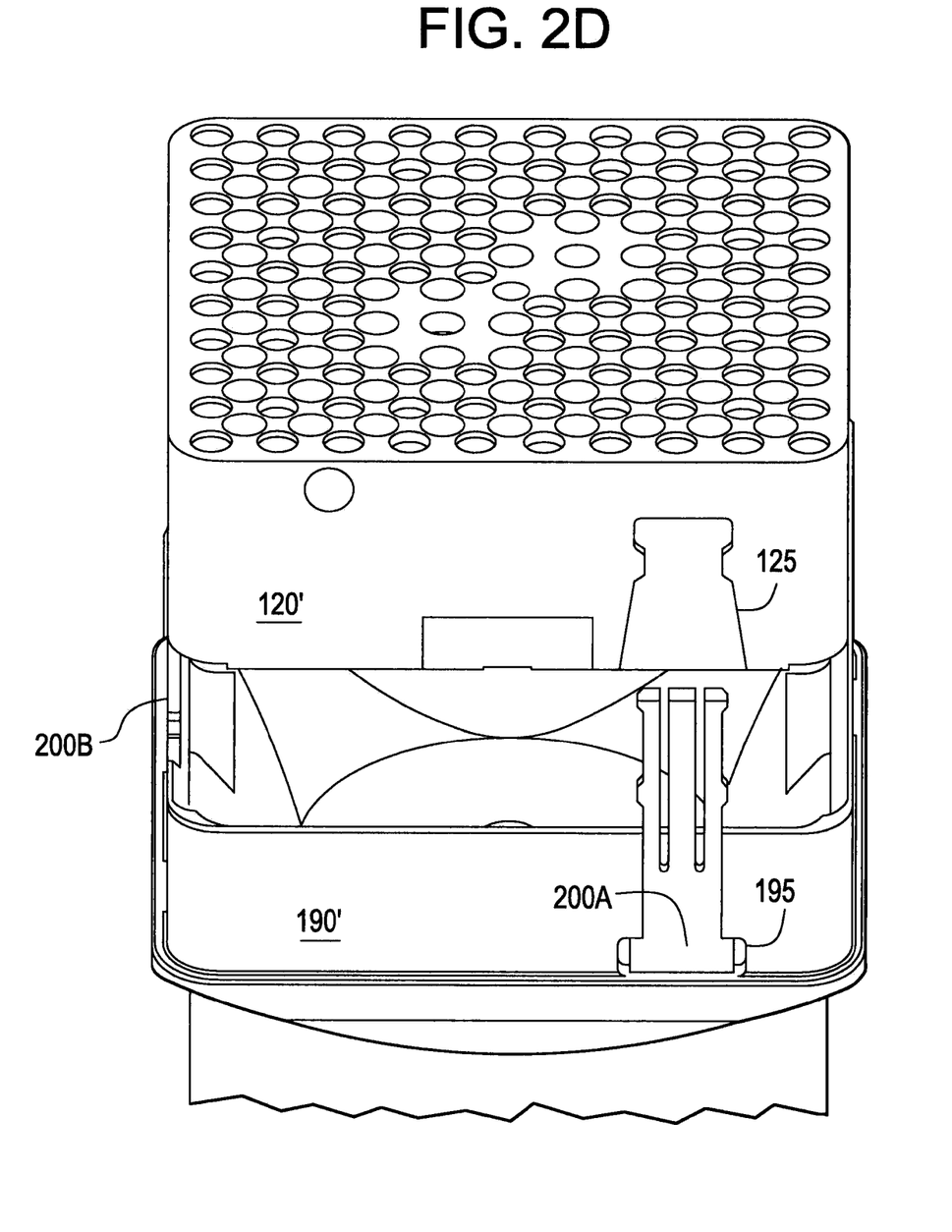
Figure 2E:
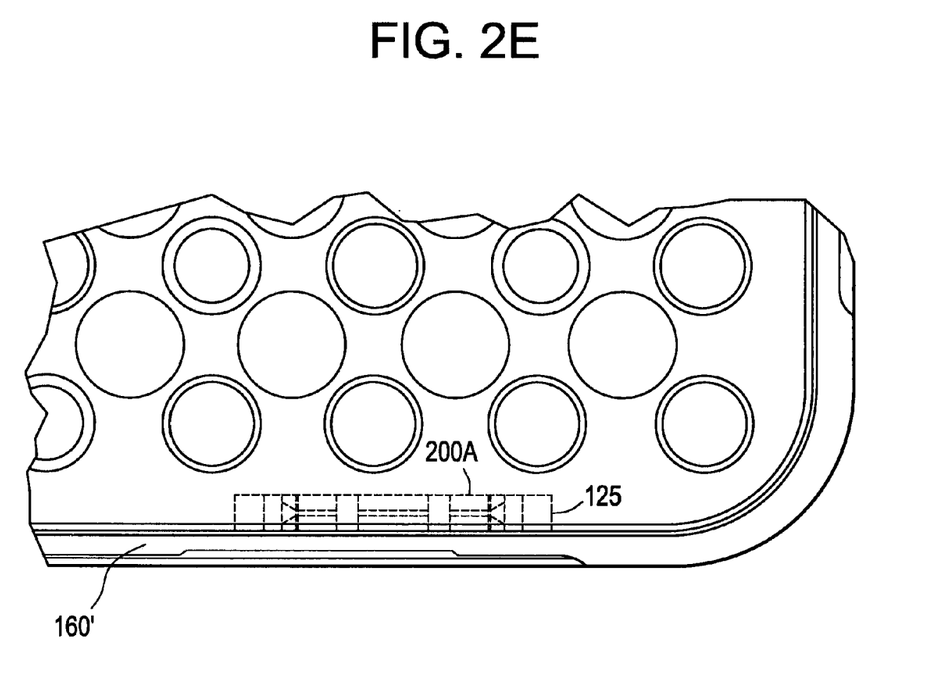

FIGS. 2A and 2B illustrate the modified fuel assembly 100' with the modified lower tie plate 120' in an assembled state in a seated position atop the modified channel nosepiece 190'. FIGS. 2C and 2D illustrate the modified fuel assembly 100' with modified lower tie plate 120' in an unassembled state just prior to assuming the seated position atop the modified channel nosepiece 190'. FIG. 2E illustrates a portion of the modified fuel assembly 100' from a viewpoint above the modified lower tie plate 120' in the assembled state seated atop the modified channel nosepiece 190' and the first bundle retention clip 200A. Further, as is illustrated in FIG. 2E, the modified fuel assembly 100' also includes a channel 160' which surrounds the modified lower tie plate 120', the first bundle retention clip 200A, which is located under an upper surface of the lower tie plate 120' as indicated by the dashed line in FIG. 2E, and at least a portion of the modified channel nosepiece 190'. Though not illustrated, the channel 160' also surrounds the second through fourth bundle retention clips 200B-D. The channel 160' is omitted from FIGS. 2A-D in order to illustrate the relationship between the modified lower tie plate 120', modified channel nosepiece 190', and the first bundle retention clip 200A.

As will be discussed in greater detail below, according to at least one example embodiment, the first through fourth bundle retention clips 200A-D provide additional margin to the aforementioned fuel bundle lift scenario by increasing the amount of upward force necessary to displace the modified lower tie plate 120' from its seated position on top of the nosepiece 190'.

Referring to FIGS. 2A-2E, as in conventional fuel assembly 100 of FIG. 1, in the modified fuel assembly 100', in an assembled state, the modified lower tie plate 120' sits atop the modified channel nosepiece 190'. However, modified channel nosepiece 190' includes an opening 195 which holds the first bundle retention clip 200A. As is illustrated in FIGS. 2A-D, an upper portion of the first bundle retention clip 200A extends above an upper surface of modified channel nosepiece 190'. Further, the modified lower tie plate 120' includes a slot 125 with which the lower tie plate receives the portion of the first bundle retention clip 200A that extends beyond the upper surface of the modified channel nosepiece 190' when the modified lower tie plate 120' is placed on top of the modified channel nosepiece 190' during assembly of the modified fuel assembly 100'. The first bundle retention clip 200A will now be discussed in greater detail below with reference to FIGS. 3A-3C. The opening 195 of the modified channel nosepiece 190' and the slot 125 of the modified lower tie plate 120' corresponding to the first bundle retention clip 200A will be discussed in greater detail below with respect to FIGS. 4 and 5 respectively.

Though the modified fuel assembly 100' is discussed above as including four bundle retention clips 200A-D, the fuel assembly 100' according to an example embodiment may have any number of bundle retention clips including, for example, 1, 2, 4 or 8, each of which may have the same structure and function as the first bundle retention clip 200A which will be discussed in greater detail below. Further, though, for the purpose of simplicity, only the opening 195 of the modified channel nosepiece 190' corresponding to the first bundle retention clip 200A is described in detail below, according to an example embodiment, for each bundle retention clip installed into the modified channel nosepiece 190', the modified channel nosepiece 190' may include a corresponding opening structured in the same manner as the opening 195. Further, though, for the purpose of simplicity, only the slot 125 of the modified lower tie plate 120' corresponding to the first bundle retention clip 200A is described in detail below, according to an example embodiment, for each bundle retention clip installed into the modified channel nosepiece 190', the modified lower tie plate 120' may include a corresponding slot structured in the same manner as the slot 125.

Bundle Retention Clip

Figure 3A:
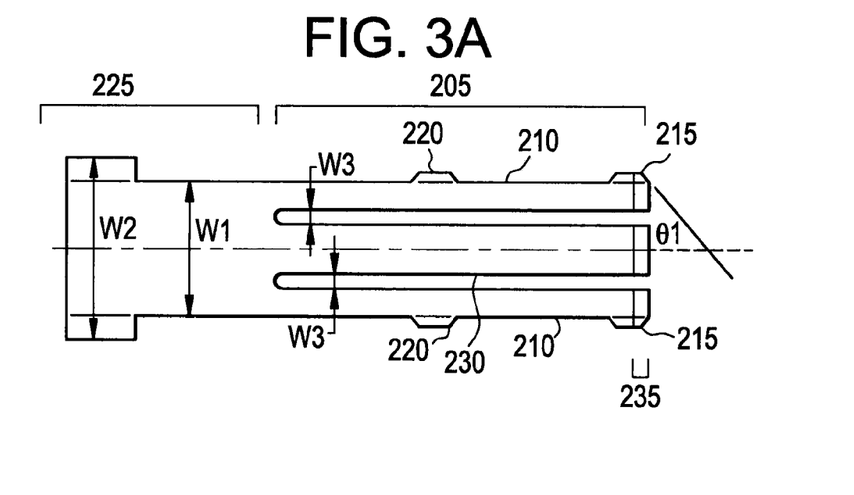
FIGS. 3A-3C are various views of a bundle retention clip.
Figure 3B:
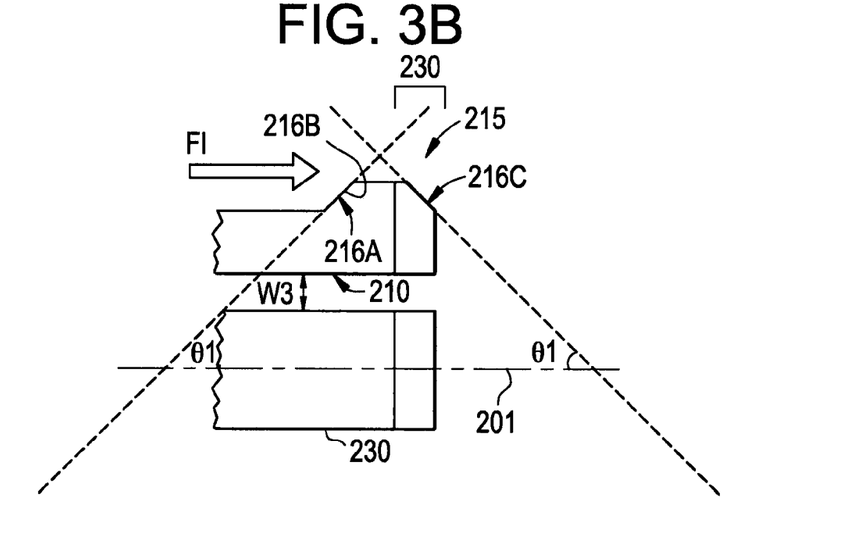
Figure 3C:
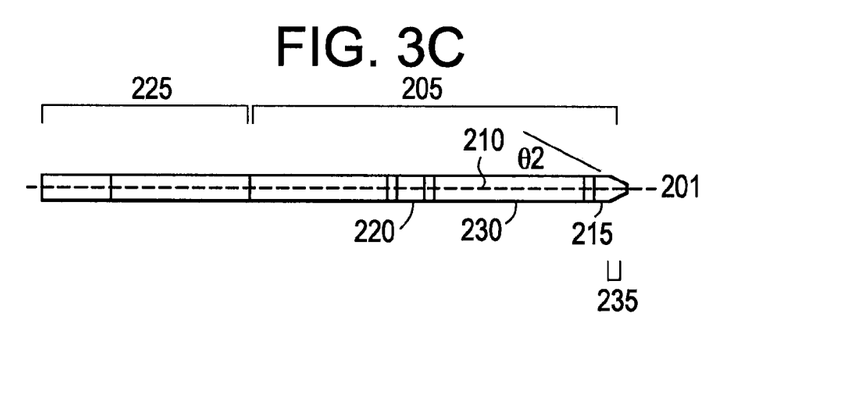

FIGS. 3A-3C illustrate various views of the first bundle retention clip 200A according to an example embodiment. According to example embodiments, second through third bundle retention clips 200B-D may have the same structure and function as the first bundle retention clip 200A. As is discussed above, first through fourth bundle retention clips 200A-D may be composed of, for example, alloy X750. FIG. 3A illustrates the first bundle retention clip 200A from a top view. FIG. 3B illustrates an enlarged portion of FIG. 3A. FIG. 3C illustrates a side view of the first bundle retention clip 200A. Referring to FIGS. 3A-3C, the first bundle retention clip 200A includes a base region 225 and an engagement region 205.

As will be discussed in greater detail below with reference to FIG. 4, the base region 225 is configured to fit stably within the opening 195 of the modified channel nosepiece 190'. According to at least one example embodiment, the base region 225 of the first bundle retention clip 200A includes varying widths W2 and W1 such that the base region 225 has an inverted 'T' shape.

As will be discussed in greater detail below with reference to FIG. 5, the engagement region 205 is configured to fit within the slot 125 of the modified lower tie plate 120' such that the bundle retention clip connects with the modified lower tie plate 120'. The engagement region 205 is configured such that the bundle retention clip can be separated from the modified lower tie plate 120' once a sufficient amount of upward force is applied.

Referring to FIGS. 3A-3C, the engagement region 205 of the first bundle retention clip 200A may include one or more spring members 210. According to at least one example embodiment, the engagement region 205 may also include a middle member 230. In the example illustrated in FIGS. 3A-3C the first bundle retention clip 200A includes two spring members 210 positioned at both sides of a central axis 201 of the first bundle retention clip 200A. As is illustrated in FIGS. 3A-3C, the central axis is defined as an axis extending down a center of the retention clip in a lengthwise direction of the retention clip. The middle member 230 is positioned in between the two spring members 210.

According to at least one example embodiment, each of the two spring members 210 are spaced apart from the middle member 230 by a width W3. The spring members 210 may be arranged as cantilever springs with respect to the rest of the first bundle retention clip 200A. For example, the spring members 210 may be configured to respond to rotational displacement inward towards the central axis 201 with a force in an outward direction away from the central axis 201.

Each of the spring members 210 includes a first projection 215. The first projections 215 may be located on an extreme end of the first bundle retention clip 200A opposite from the base region 225 and may extend outwards in a direction perpendicular to the central axis 201 of the first bundle retention clip 200A. According to at least one example embodiment, the first projections 215 may be trapezoidal in shape. Referring to FIG. 3B, the first projections 215 of the spring members 210 may each include first through third edges 216A-216C. The first and third edges may be angled with respect to the central axis 201 at an angle θ1. The second edge 216B may be parallel with respect to the central axis 201. The angle θ1 may be selected such that application of a force F1 in a direction parallel to the central axis 201 of the first bundle retention clip 200A to the first edge 216A of the first projection 215 causes the spring member 210 to contract or rotate inwards towards the central axis 201. The angle θ1 may be any angle which achieves the above-referenced effect including, for example, 48±3°

The engagement region 205 of the first bundle retention clip 200A may include a tip region 235. The tip region 235 may include extreme portions of the spring members 210 and the middle member 230 farthest away from the base region 225. As is illustrated in FIG. 3C, the portions of the spring members 210 and middle member 230 which fall within the tip region 235 may be tapered. For example, with reference to the central axis 201, edges of spring members 210 and the middle member 230 within the tip region 235 may be angled at an angle θ2. The angle θ2 may be, for example, 30±5°.

Returning to FIG. 3A, the spring members 210 may optionally include second projections 220. The second projections are located in between the first projections 215 and the base region 225 and may extend outwards, for example, in a direction perpendicular to the central axis 201 of the first bundle retention clip 200A. The second projections may have any shape including, for example, the same trapezoidal shape of the first projections 215. As will be discussed in greater detail below with reference to FIG. 4, the second projections 220 may prevent incorrect installation of the first bundle retention clip 200A into the opening 195 of the modified channel nosepiece 190'.

Though, in the examples discussed above the first bundle retention clip 200A is described as including two spring members 210, the first bundle retention clip 200A may have any number of spring members. For example, the bundle retention clip may have only one spring member, or more than two spring members. Further, though in the examples discussed above the first bundle retention clip 200A is described as including a middle member 230, the middle member 230 may be omitted and the engagement region 205 of the bundle retention clip may include, for example, only spring members.

The modified channel nosepiece 190' will now be discussed in greater detail below with reference to FIG. 4.

Modified Channel Nosepiece

Figure 4:
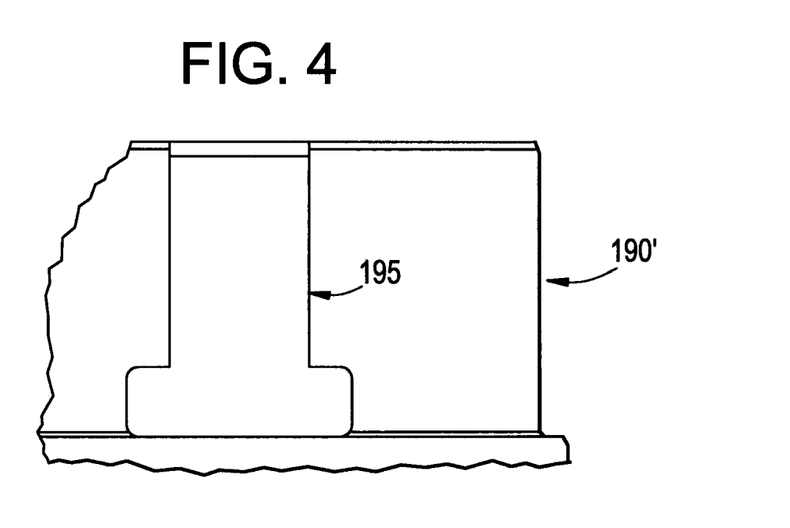
FIG. 4 is an enlarged view of an opening of a modified channel nosepiece according to at least on example embodiment.

FIG. 4 illustrates an enlarged view of the opening 195 of the modified channel nosepiece 190'. The opening 195 is configured to hold the base region 225 of the first bundle retention clip 200A upon installation of the retention clip 200 in the modified channel nosepiece 190'. The base region 225 and the opening 195 may be configured such that, after the first bundle retention clip 200A is installed in the modified channel nosepiece 190', movement of the first bundle retention clip 200A with respect to the modified channel nosepiece 190' is prevented. Accordingly, the opening 195 may have a shape corresponding to a shape of the base region 225 of the first bundle retention clip 200A so the base region 225 is held firmly by the opening 195 of the modified channel nosepiece 190'. For example, as is illustrated in FIG. 4, the opening 195 of the modified channel nosepiece 190' may have an inverted 'T' shape corresponding to the inverted 'T' shape of the base region 225 of the first bundle retention clip 200A. Dimensions of the opening 195 may be configured to allow easy installation of the first bundle retention clip 200A. For example, dimensions of the opening 195 may be set such that a lateral gap between the opening 195 and base region 225 is 0.33±0.26 mm. These dimensions provide a minimum lateral gap of 0.07 mm. Dimensions of the opening 195 may be set such that a horizontal gap between the opening 195 and base region 225 is, for example, 0.33±0.26 mm. These dimensions provide a minimum horizontal gap of 0.07 mm.

Further, because the opening 195 has the same inverted 'T' shape as the base region 225 of the bundle retention clip, the second projections 230 of the first bundle retention clip 200A will not allow the engagement region 205 of the first bundle retention clip 200A to fit into the opening 195. Accordingly, an incorrect, upside down installation of the first bundle retention clip 200A into the opening 195 of the modified channel nosepiece 190' is prevented. The modified lower tie plate 120' will now be discussed in greater detail below with reference to FIGS. 5 and 6.

Modified Lower Tie Plate

Figure 5:
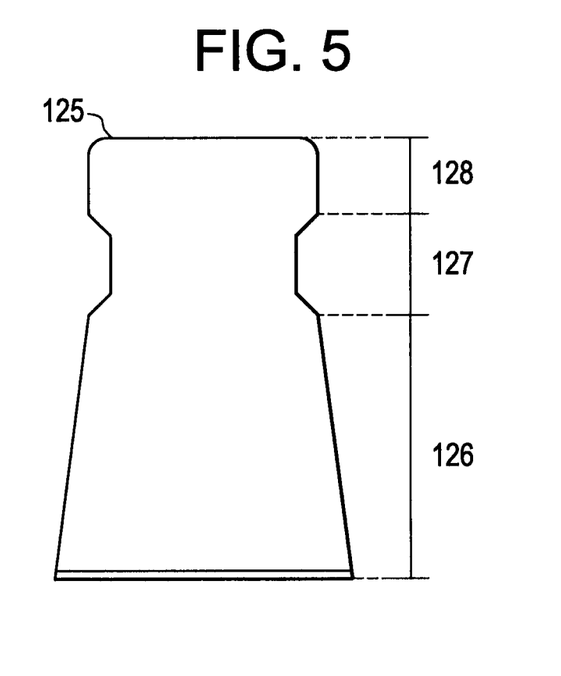
FIG. 5 is an enlarged view of a slot of a modified lower tie plate according to at least on example embodiment.
Figure 6:
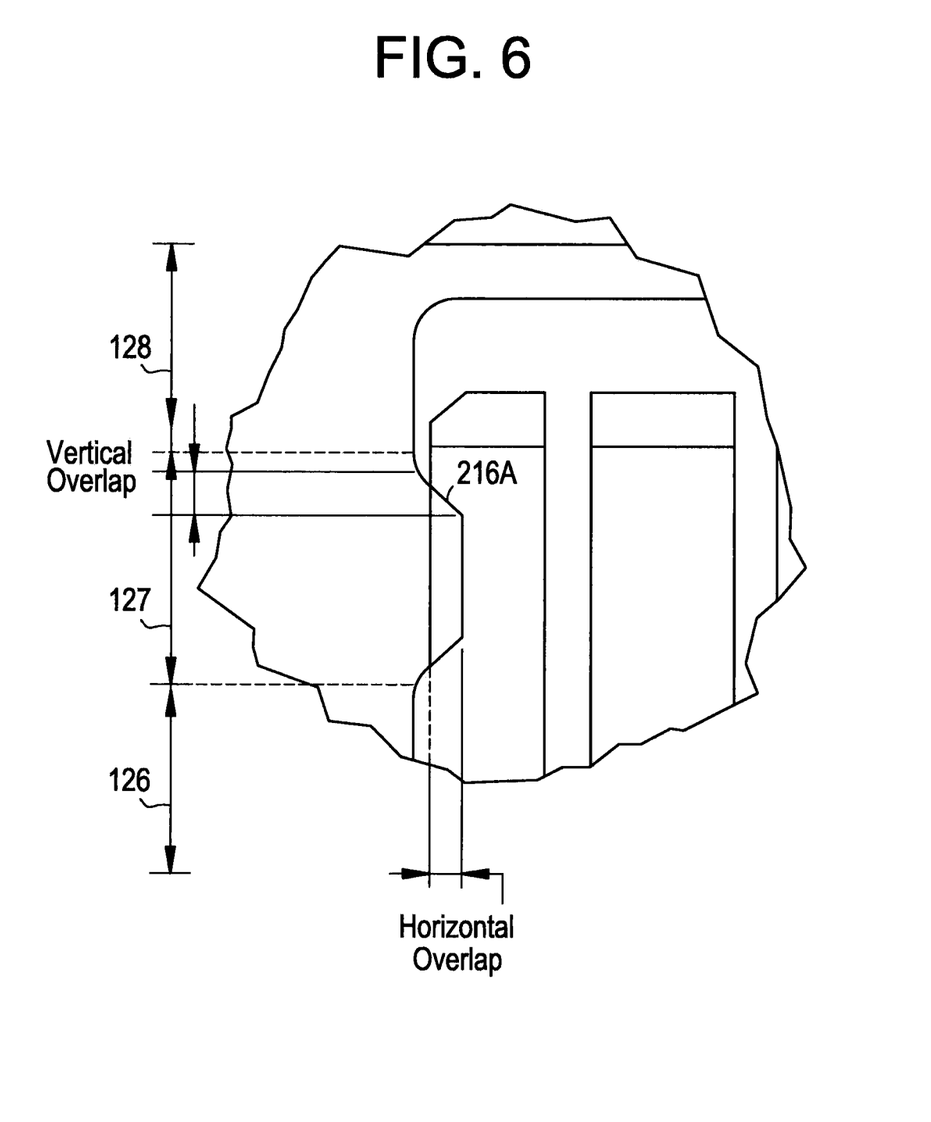
FIG. 6 is an enlarged view of a portion of an engagement region of a bundle retention clip inserted into the slot of the modified lower tie plate.

FIG. 5 illustrates an enlarged view of the slot 125 of the modified lower tie plate 120'. FIG. 6 illustrates an enlarged view of a portion of the engagement region 205 of the first bundle retention clip 200A inserted into the slot 125 of the modified lower tie plate 120'. Referring to FIG. 5, the slot 125 is configured to accept entry of the engagement region 205 of the first bundle retention clip 200A. The slot 125 is further configured such that after entry of the engagement region 205 in the slot 125 of the modified lower tie plate 120', the engagement region 205 resists upward movement of the modified lower tie plate 120' away from the channel nosepiece. For example, the slot 125 may have three regions of varying width including a slot opening region 126, a slot middle region 127, and a slot end region 128. As is illustrated in FIG. 5, the slot opening region 126 has a tapered width which may decrease gradually from the bottom of the modified lower tie plate 120' towards the top of the modified lower tie plate 120'. According to at least one example embodiment, an opening end of the opening region 126 may be wider than a total width of both spring members 210, including the first projection 215, in order to facilitate initial entry of the engagement region 205 of the first bundle retention clip 200A into the slot 125 of the modified lower tie plate 120', and to accommodate the second projections 230 which may be optionally included in the spring members 210. The slot middle region 127 has a width which decreases sharply with respect to a width of an upper portion of the slot opening region. The slot end region 128 has a width which increases sharply with respect to the width of the slot middle region 127. With this configuration, during entry of the first bundle retention clip 200A into the slot 125 of the modified lower tie plate 120', the spring members 210, including the first projections 215, fit into the opening region 126 of the slot 125 and are forced to contract, or rotate, inwards towards the central axis 201 upon reaching the slot middle region 127 of the slot 125. Further, upon reaching the slot end region 128 of the slot 125, the increased width of the slot end region 128 relative to the slot middle region 127 allows the spring members 201 to rotate outwards back towards their original position.

Referring to FIG. 6, the width of the slot end region 128 of the slot 125 may be wide enough to allow the spring members 210 of the first bundle retention clip 200A to assume their original position relative to the central axis 201, the original position being the position of the spring member 210 before entry into the slot 125.

Further, as is illustrated in FIG. 6, edges of an upper portion of the slot middle region 127 may be angled at the same angle $\theta 1$ of the first edges 216A discussed above. Accordingly, after entry of the engagement region 205 into the slot end region 128 of the slot 125, the first edges 216A of the first projections 215 of the first bundle retention clip 200A may overlap with the edges of the slot 125 in both the vertical and horizontal directions. Due to this overlap, upward motion of the modified lower tie plate 120' relative to the first bundle retention clip 200A will cause the modified lower tie plate 120' to exert an upward force on the first edges 216A of the first projections 215. Due to the angle $\theta 1$ of the first edges 216A of the first projections 215, the upward force exerted by the modified lower tie plate 120' will cause the spring members 210 of the first bundle retention clip 200A to contract or rotate inwards towards the central axis 201 of the first bundle retention clip 200A. The angle $\theta 1$ of the first edges 216A of the first projections 215 will also cause the inward rotation of the spring members 210 to increase as the upward movement of the lower tie plate 120 relative to bundle retention clip 200 increases. Due to the cantilever spring arrangement of the spring members 210, the inward rotation of the spring member 210 will cause the spring members 210 to respond by exerting an outward, lateral force away from the central axis 201 on the edges of the slot 125. Further, as the inward rotation of the spring members 210 towards the central axis 201 increases, so will the outward lateral force exerted by the spring members 210 on the edges of the slot 125. The angled edges within the slot middle region 127 of the slot 125 will convert the lateral force exerted by the spring members 210 into a downward force applied to the modified lower tie plate 120'. This downward force will increasingly resist the upward movement of the modified lower tie plate 120' relative to the first bundle retention clip 200A until the upward movement of the modified lower tie plate 120' is sufficient to remove the engagement region 205 of the first bundle retention clip 200A from the slot end region 128 and the slot middle region 127 of the slot 125. At this point, the engagement region 205 of the first bundle retention clip 200A may no longer provide substantial resistance to the upward movement of the modified lower tie plate 120'.

According to at least one example embodiment, dimensions of the slot 125 may be selected such that after entry of the engagement region 205 of the first bundle retention clip 200A into the slot end region 128 of the slot 125, and before any upward movement of the modified lower tie plate 120', the spring members 120' are not forced inwards towards the central axis 210. Accordingly, the spring members 210 may exert no lateral force on the modified lower tie plate 120' when the lateral tie plate 120' is in its seated position atop the modified channel nosepiece 190'. A method of assembling a fuel assembly including a bundle retention clip according to example embodiments will now be discussed below with reference to FIG. 7.

Figure 7:
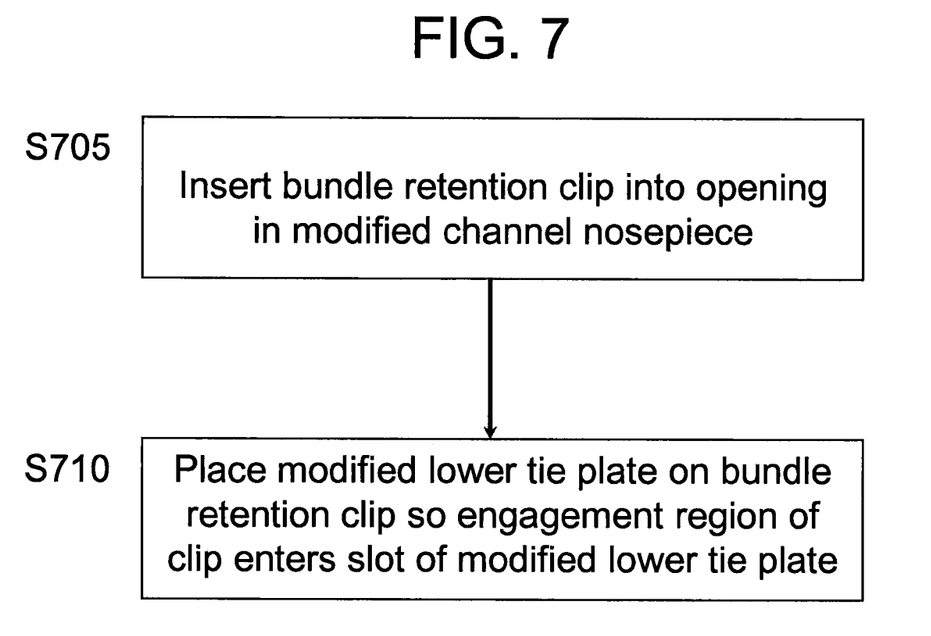
FIG. 7 is a flowchart illustrating a method of assembling fuel assembly including a bundle retention clip according to an example embodiment.

FIG. 7 is a flowchart illustrating a method of assembling a fuel assembly including a bundle retention clip according to an example embodiment. For the purpose of simplicity, FIG. 7 will be described below with reference to the first bundle retention clip 200A, modified lower tie plate 120' and modified channel nosepiece 190' of the modified fuel assembly 100'. However, the method illustrated in FIG. 7 may be applied to each of first through fourth bundle retention clips 200A-D.

Referring to FIG. 7, in step S705 the bundle retention clip 200A is inserted into the opening 195 of the modified channel nosepiece 190'. For example, the base region 225 of the first bundle retention clip 200A is placed into the opening 195.

In step S710, the modified lower tie plate 120' is placed on the bundle retention clip 200A such that the engagement region 205 of the first bundle retention clip 200A enters slot 125 of the modified lower tie plate 120'. For example, the lower tie plate 120' may be lowered to a seated position atop the channel nosepiece 190' such that the engagement region 205 of the first bundle retention clip 200A enters the slot end region 128 of the slot 125.

Thus, the slot 125 of the modified lower tie plate 120' and the engagement region 205 of the first bundle retention clip 200A are configured such that, though removal of the modified lower tie plate 120' from the modified channel nosepiece 190' is resisted, the modified lower tie plate 120' can be removed from its seated position atop the modified channel nosepiece 190' upon application of sufficient upward force. Accordingly, using the first through fourth bundle retention clips 200A-D, a plant operator can assemble the modified fuel assembly 100' by attaching the modified lower tie plate 120' to the modified channel nosepiece 190' in a manner that prevents unintentional displacement of the modified lower tie plate 120' from its seated position atop the modified channel nosepiece 190' while allowing intentional removal of the modified lower tie plate 120' from the modified channel nosepiece 190' when desired.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

What is claimed:

1. A fuel assembly comprising:
    a channel nosepiece;
    a lower tie plate positioned above the channel nosepiece; and
    at least one bundle retention clip connected to the channel nosepiece and the lower tie plate and configured to resist movement of the lower tie plate away from the channel nosepiece,
    wherein the lower tie plate includes at least one slot, and the at least one bundle retention clip includes an engagement region configured to be inserted into the slot,
    wherein the at least one slot and the engagement region are configured such that once the engagement region is inserted into the slot, the retention clip responds to vertical separation of the lower tie plate and the bundle retention clip by causing a force to be exerted on the lower tie plate in a direction towards the channel nosepiece,
    wherein the engagement region includes at least one spring member, the at least one spring member including a first protrusion extending outward from a central axis of the retention clip, the first protrusion including a first edge angled with respect to the central axis at a first angle, the slot being configured to engage the first edge such that, after the engagement region is inserted into the slot, the
        slot causes the first spring member to contract towards the central axis during the vertical separation of the lower tie plate and the bundle retention clip, and
    an amount of the contraction of the first spring member towards the central axis increases as the vertical separation increases, thereby increasing the force exerted on the lower tie plate as the vertical separation increases, the central axis being defined as an axis extending down a center of the retention clip along a length of the retention clip.

2. The fuel assembly of claim 1, wherein the at least one bundle retention clip further includes a base region connected to the engagement region, at least a portion of the base region being wider than a remainder of the retention clip in a direction perpendicular to the central axis.

3. The fuel assembly of claim 1, wherein the first angle is between 45° and 52°.

4. The fuel assembly of claim 1, wherein the at least one spring member includes a second protrusion extending outward from the central axis and spaced apart from the first protrusion.

5. The fuel assembly of claim 4, wherein the at least one spring member is arranged as a cantilever spring capable of rotating inwards towards the central axis and configured to respond to the inward rotation by exerting an outward, lateral force.

6. The fuel assembly of claim 1, wherein the at least one spring member includes first and second spring members at opposite sides of the central axis.

7. The fuel assembly of claim 1, wherein the engagement region further includes a middle member in between the first and second spring members such that a first gap exists between the middle member and the first spring member, and a second gap exists between the middle member and the second spring member.

* * * * *